UNITED STATES PATENT OFFICE.

JEAN JAMETON, OF ST. LOUIS, MISSOURI.

COMPOSITION FOR BLACKBOARDS.

SPECIFICATION forming part of Letters Patent No. 356,363, dated January 18, 1887.

Application filed August 30, 1886. Serial No. 212,217. (No specimens.)

*To all whom it may concern:*

Be it known that I, JEAN JAMETON, of St. Louis, Missouri, have made a new and useful Improvement in Composition for Blackboards, of which the following is a full, clear, and exact description.

The improvement relates to that class of blackboard material which is applied to and made part of the plastered wall of a room.

The principal feature of the improved material is coke dust. This substance is of an alkaline nature and it contains nothing of an oily nature, and it makes a finish for a wall not only notably solid and firm, but elastic and tough. For blackboard purposes it is desirable to employ with it a smaller quantity of "soap-plaster," as it is termed. Carbon or drop-black is also added, and to make a nice finish upon which a chalk-mark can be easily erased a minute quantity of graphite may be included, and all then combined with plaster-of-paris.

The following formula gives the best-known results: of coke dust, by weight, fifty parts; of soap-plaster, thirty-nine parts; of carbon-black, ten parts; of graphite, one part: total, one hundred parts. To this compound add the plaster-of-paris, and in amount one-sixth, by weight, of the entire compound, or one-fifth of the first named compound.

A wall finished with this improved material is not liable to shrink or crack, and hence is well adapted for frescoing or oil-painting.

A larger quantity—say seventy-five per cent.—of coke dust, and a smaller quantity—say fourteen per cent.—of soap-plaster, might be used in forming the first-named compound.

I claim—

The herein-described blackboard material compound, consisting of coke dust, soap-plaster, and carbon-black, combined in the proportions substantially as set forth.

JEAN JAMETON.

Witnesses:
C. D. MOODY,
J. W. HOKE.